(12) United States Patent
Zhao

(10) Patent No.: US 9,037,415 B2
(45) Date of Patent: May 19, 2015

(54) OBM RESISTIVITY IMAGE ENHANCEMENT USING PRINCIPAL COMPONENT ANALYSIS WITH FIRST MOMENT ESTIMATION

(75) Inventor: Jinsong Zhao, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 493 days.

(21) Appl. No.: 13/445,502

(22) Filed: Apr. 12, 2012

(65) Prior Publication Data

US 2012/0265442 A1 Oct. 18, 2012

Related U.S. Application Data

(60) Provisional application No. 61/475,400, filed on Apr. 14, 2011.

(51) Int. Cl.
*G06F 19/00* (2011.01)
*G01V 3/20* (2006.01)
*G01V 3/38* (2006.01)

(52) U.S. Cl.
CPC ... *G01V 3/20* (2013.01); *G01V 3/38* (2013.01)

(58) Field of Classification Search
USPC ......... 702/6, 7, 10, 11, 13, 53, 57, 64, 65, 75, 702/189
See application file for complete search history.

(56) References Cited

U.S. PATENT DOCUMENTS

| | | | |
|---|---|---|---|
| 6,714,014 B2 | 3/2004 | Evans et al. | |
| 7,394,258 B2 * | 7/2008 | Itskovich et al. | 324/357 |
| 7,529,152 B2 | 5/2009 | Sinha et al. | |
| 7,797,111 B2 | 9/2010 | Forgang et al. | |
| 7,888,941 B2 | 2/2011 | San Martin et al. | |
| 7,896,073 B2 | 3/2011 | Forgang et al. | |
| 8,258,790 B2 | 9/2012 | Folberth et al. | |
| 2009/0243619 A1 | 10/2009 | Bespalov et al. | |
| 2009/0292471 A1 * | 11/2009 | Bespalov et al. | 702/7 |
| 2009/0302854 A1 | 12/2009 | Forgang et al. | |
| 2009/0306896 A1 | 12/2009 | Forgang et al. | |
| 2010/0198519 A1 | 8/2010 | Wilt et al. | |
| 2011/0036569 A1 | 2/2011 | Bass et al. | |
| 2012/0059616 A1 | 3/2012 | Zhao | |

FOREIGN PATENT DOCUMENTS

WO 0039612 A1 7/2000

* cited by examiner

*Primary Examiner* — Mohamed Charioui
*Assistant Examiner* — Carl D Nelson
(74) *Attorney, Agent, or Firm* — Mossman Kumar & Tyler PC

(57) ABSTRACT

Method and apparatus for estimating a resistivity property of an earth formation in a borehole with oil-based drilling fluid. The method may include estimating the resistivity property using a sensitivity of a real part of a measured impedance to a reactance of a gap between a resistivity sensor and a borehole wall. The real component and the quadrature component of resistivity measurements made by a two-terminal imaging tool in a borehole having an oil-based mud are affected by the tool standoff. It is shown that the sensitivity of the real part of the resistivity measurement to the reactance of the gap can be estimated from the time derivatives of the two components of the measurements. This makes possible a principal component analysis of the data to give an improved image of the formation resistivity.

16 Claims, 9 Drawing Sheets

Rf,(PCA)

Xc,m

Rf,M

OBM RESISTIVITY IMAGE ENHANCEMENT USING PRINCIPAL COMPONENT ANALYSIS WITH FIRST MOMENT ESTIMATION

CROSS-REFERENCE TO RELATED APPLICATION

This application claims priority from U.S. Provisional Patent Application Ser. No. 61/475,400, filed on 14 Apr. 2011.

BACKGROUND OF THE DISCLOSURE

1. Field of the Disclosure

The present disclosure is related to methods for measuring a resistance of an earth formation downhole. In particular, the present disclosure is related to providing a correction for standoff in resistance measurements.

2. Description of the Related Art

In oil exploration, resistivity measurements of an earth formation are typically obtained by lowering a resistivity tool into a borehole penetrating the formation. Generally, the tool includes at least one current transmitter which introduces current into the formation and at least one return electrode at which current returns to the tool. Resistance is measured between the two electrodes. Ideally, current flows directly from the current transmitter through the earth formation and returns through the return electrode. In typical downhole situations, however, the resistivity tool is separated from the formation by a gap filled with oil-based mud (OBM) that is used for the purposes of drilling. The gap may be uniform along the length of the borehole or may experience variations due to borehole rugosity. The presence of mud and borehole rugosity affects the value of resistivity measurements obtained from the formation.

Several methods are used to reduce the effect of borehole irregularities and standoff, such as obtaining dual frequency measurements and post-processing based on a corresponding calculation; deriving a mud parameter $\alpha = (\rho_m \omega \epsilon_m \epsilon_0)^{-1}$ from direct mud cell measurements; and obtaining multi-standoff measurements and post-processing based on a corresponding calculation; among others. These methods rely on obtaining an additional measurement to derive the mud parameter and can require new tool designs and/or assumptions about the dispersive characteristics of the mud. Thus, there is a need to provide a correction to resistivity measurements in the presence of the oil-based mud in a gap based on an analysis of the data and which does not require any additional measurements or prior information about the mud's electrical properties. The present disclosure satisfies this need.

SUMMARY OF THE DISCLOSURE

One embodiment of the disclosure is a method of estimating a resistivity property of an earth formation in a borehole filled with oil-based mud. The method includes: conveying a carrier into a borehole; measuring a plurality of apparent impedance values of the earth formation using a resistivity sensor on the carrier, using a sensitivity of a real part of the measured impedance to a reactance of a gap between the resistivity sensor and a borehole wall for estimating a resistivity property of the earth formation.

Another embodiment of the disclosure is an apparatus configured estimate a resistivity property of an earth formation in a borehole filled with oil-based mud. The apparatus includes: a carrier configured to be conveyed into a borehole; a resistivity sensor on the carrier configured to measure a plurality of apparent impedance values of the earth formation, and a processor configured to use a sensitivity of a real part of the measured impedance to a reactance of a gap between the resistivity sensor and a borehole wall for estimating a resistivity property of the earth formation.

Another embodiment of the disclosure is a non-transitory computer-readable medium product having thereon instructions that when read by a processor cause the processor to execute a method. The method includes: using a sensitivity of a real part of an impedance measured by a resistivity sensor conveyed in a borehole to a reactance of a gap between the resistivity sensor and a borehole wall for estimating a resistivity property of the earth formation.

BRIEF DESCRIPTION OF THE DRAWINGS

The present disclosure is best understood with reference to the accompanying figures in which like numerals refer to like elements, and in which.

DETAILED DESCRIPTION OF THE DISCLOSURE

Figure 1:
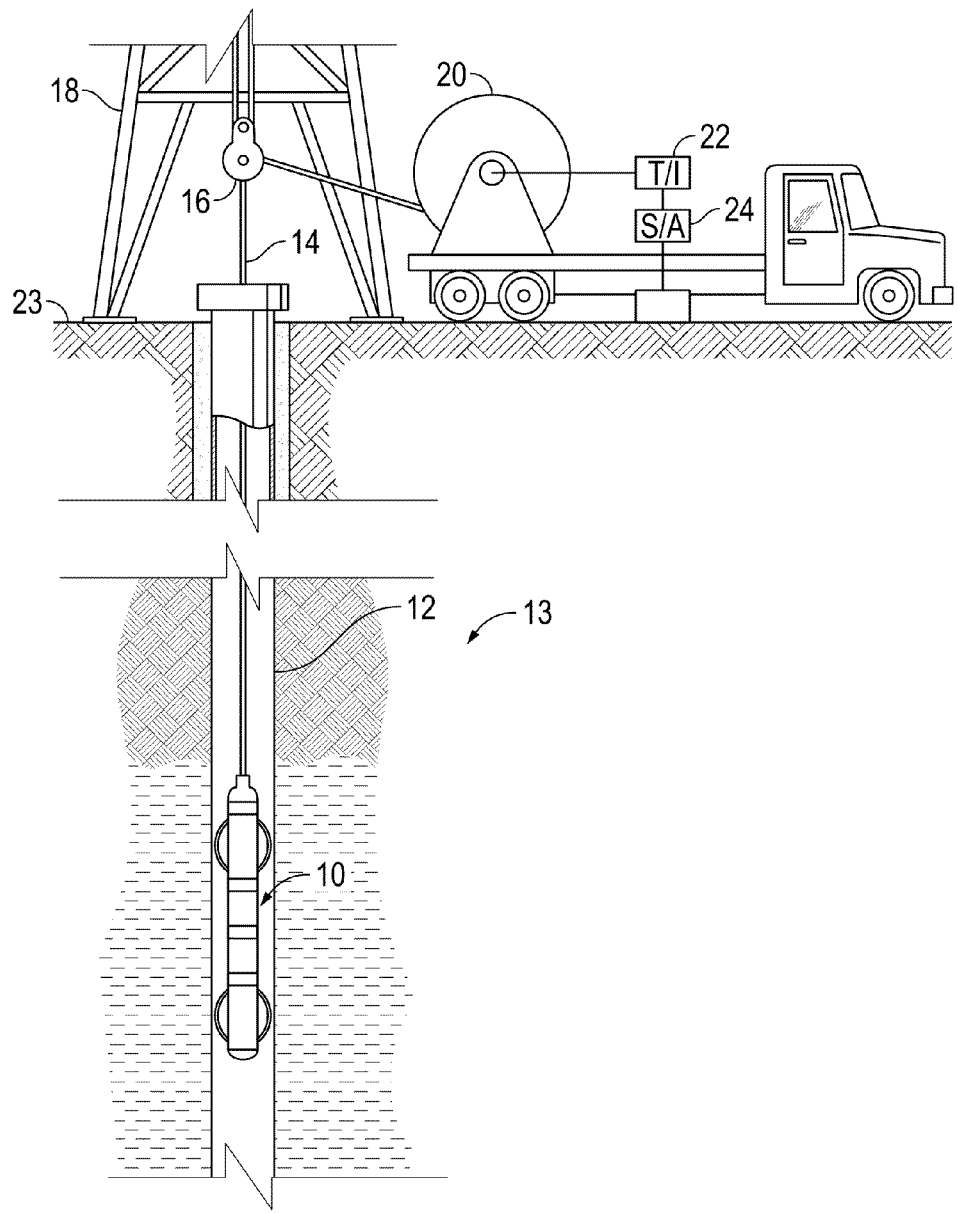
FIG. 1 shows an exemplary imaging tool suspended from a suitable cable into a borehole that penetrates an earth formation.

FIG. 1 shows an exemplary imaging tool 10 suspended in a borehole 12, that penetrates earth formations such as 13, from a carrier such as cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data. Carrier 14 may include, but is not limited to, one or more of: (i) a wireline, (ii) a drill string, (iii) coiled tubing, and (iv) a slickline.

Figures 2A, 2B:
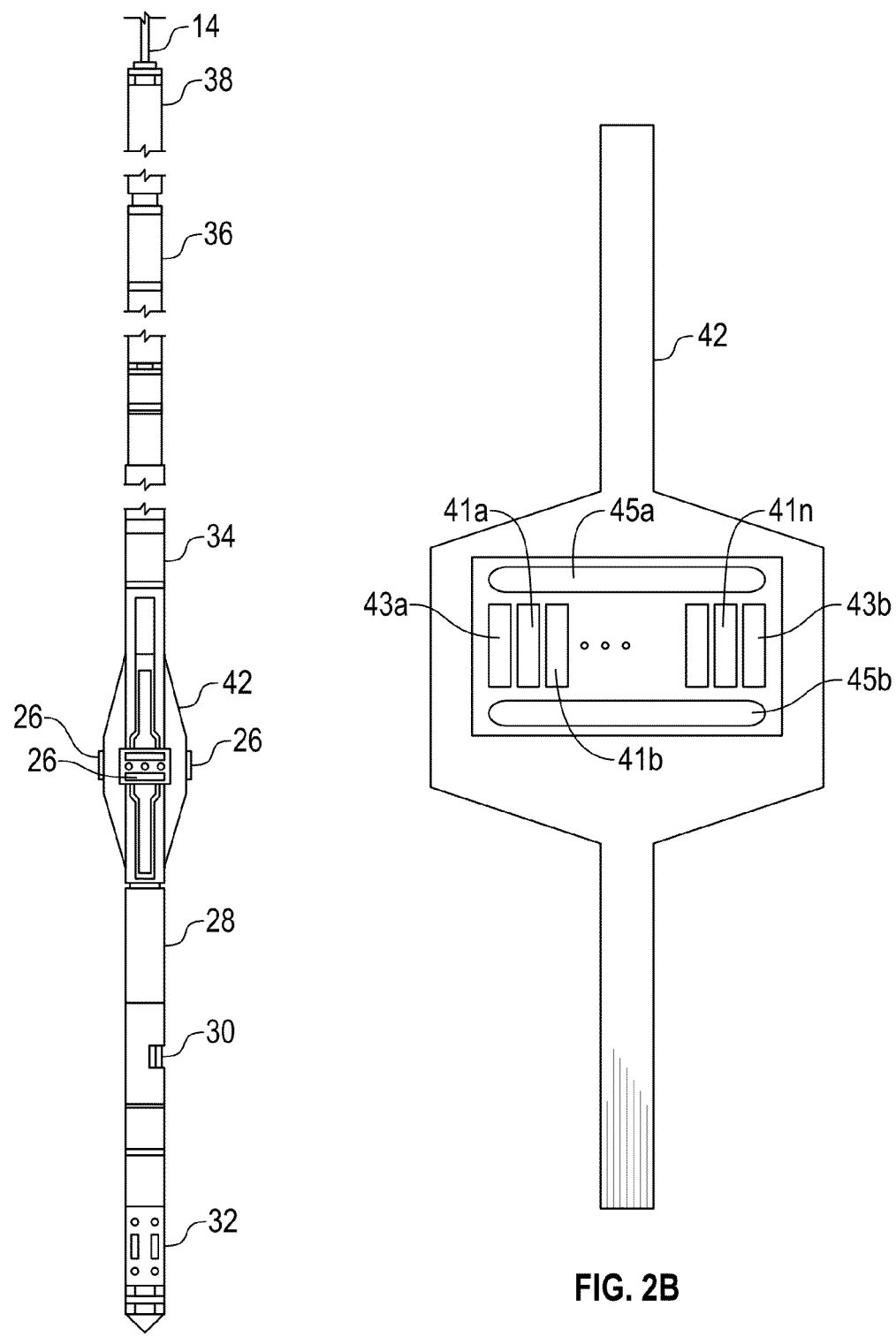
FIG. 2A is a schematic external view of an exemplary borehole sidewall imager system according to one aspect of the present disclosure.
FIG. 2B shows an array including electrodes for injecting electrical currents into the formation.

FIG. 2A is a schematic external view of an exemplary borehole sidewall imager system according to one aspect of the present disclosure. The tool 10 including the imager system includes resistivity arrays 26 and, optionally, a mud cell 30 and a circumferential acoustic televiewer 32. The resistivity arrays 26 may be secured to extendable arms such as 42. The extendable arms 42 may be configured to provide an estimate of actual borehole diameter as is well known in the art. Electronics modules 28 and 38 may be located at suitable locations in the system and not necessarily in the locations indicated. The components may be mounted on a mandrel 34 in a conventional well-known manner. An orientation module 36 including a magnetometer and an accelerometer or inertial guidance system may be mounted above the imaging assemblies 26 and 32. The upper portion 38 of the tool 10 contains a telemetry module for sampling, digitizing and transmission of the data samples from the various components uphole to surface electronics (electronic module) 22 in a conventional manner. If acoustic data are acquired, they are preferably digitized, although in an alternate arrangement, the data may be retained in analog form for transmission to the surface where it is later digitized by surface electronics (electronic module) 22.

Also shown in FIG. 2A are three resistivity arrays 26 (a fourth array is hidden in this view). Referring to FIGS. 2A and 2B, each array includes measure electrodes 41a, 41b, . . . 41n for injecting electrical currents into the formation, focusing electrodes 43a, 43b for horizontal focusing of the electrical currents from the measure electrodes and focusing electrodes 45a, 45b for vertical focusing of the electrical currents from the measure electrodes. By convention, "vertical" refers to the direction along the axis of the borehole and "horizontal" refers to a plane perpendicular to the vertical.

Figure 3A:
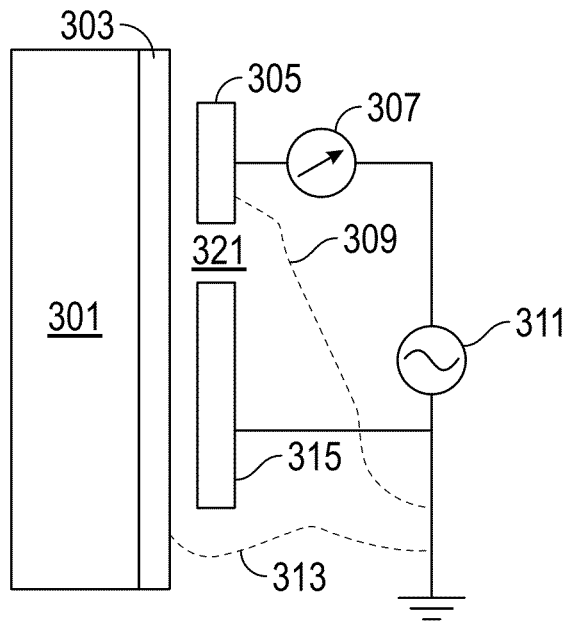
FIG. 3A shows the physical model for the two terminal OBM impedance measurement.

FIG. 3A shows the physical layout of a Two Terminal OBM impedance measurement device. The earth formation is denoted by 301. The borehole 321 is filled with a oil-based mud 303. The measurement electrode is denoted by 305 and the return electrode is denoted by 315. A power source 311 provides a voltage to the measurement electrode 305. The current in the measurement electrode is denoted by 307. Leakage current path between the measure electrode 305 and ground is denoted by 309 while the leakage current path between the return electrode 315 and ground is denoted by 313.

Figure 3B:
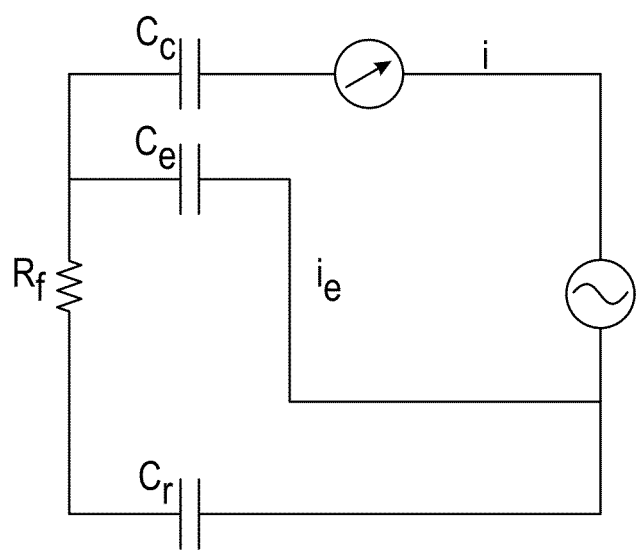
FIG. 3B shows the equivalent circuit of the physical model of FIG. 3A.

The equivalent circuit for the physical layout of FIG. 3A is shown in FIG. 3B. Here, the formation is assumed to be resistive and has a resistance $R_f$. The measure current is denoted by i. The capacitance at the measure electrode is denoted by $C_e$ while the capacitance at the return electrode is denoted by $C_r$. The leakage capacitance is denoted by $C_e$. The problem is to estimate $R_f$ without knowledge of the leakage current $i_e$. The measured impedance $Z_m$ is given by $$Z_m = \frac{v}{i} = R_{f,m} + jX_{c,m}, \quad (1)$$

where $$R_{f,m} = k_0 R_f + k_1 X_c + k_2 X_c^2 \quad (2)$$
$$X_{c,m} = k_R R_f + k_c X_c$$
$$X_c = \frac{1}{\omega C_c}.$$

In eqns. (1) and (2), the subscript "m" refers to measured quantities. An assumption is made that $C_e \gg C_r \gg C_c$. The measured impedance may also be referred to as an apparent impedance. It should be noted that the first pair of the eqns. (2) is for exemplary purposes only and not to be construed as a limitation.

The present disclosure is based upon the following principles.
1. It is a fact that the formation resistivity $R_f$ is independent of the tool standoff and the reactance $X_c$.
2. The measurements $R_{f,m}$ and $X_{c,m}$ are nonlinearly related.
3. The image of $R_{f,m}$ is degraded by changes in $X_{c,m}$ that cannot be controlled during logging operations.
4. A linear principal component analysis (PCA) is used to separate the correlation between $R_{f,m}$ and $X_{c,m}$. Due to the fact that the major nonlinearity is a quadratic term in $X_c$, a linearization is adequate. The linearization uses an estimate of $$\frac{\partial R_{f,m}}{\partial X_c} = k_1 + 2k_2 X_c$$

from eqn (2).

Figure 4A:
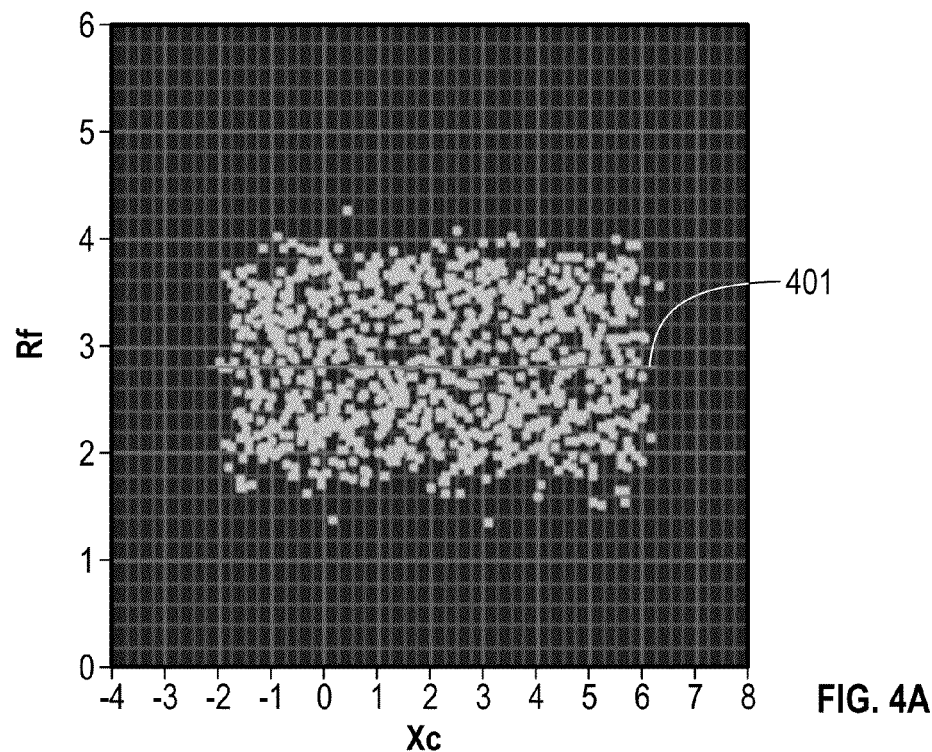
FIG. 4A illustrates a model with uncorrelated noise on the formation resistivity and the reactance at the measure electrode.
Figure 4B:
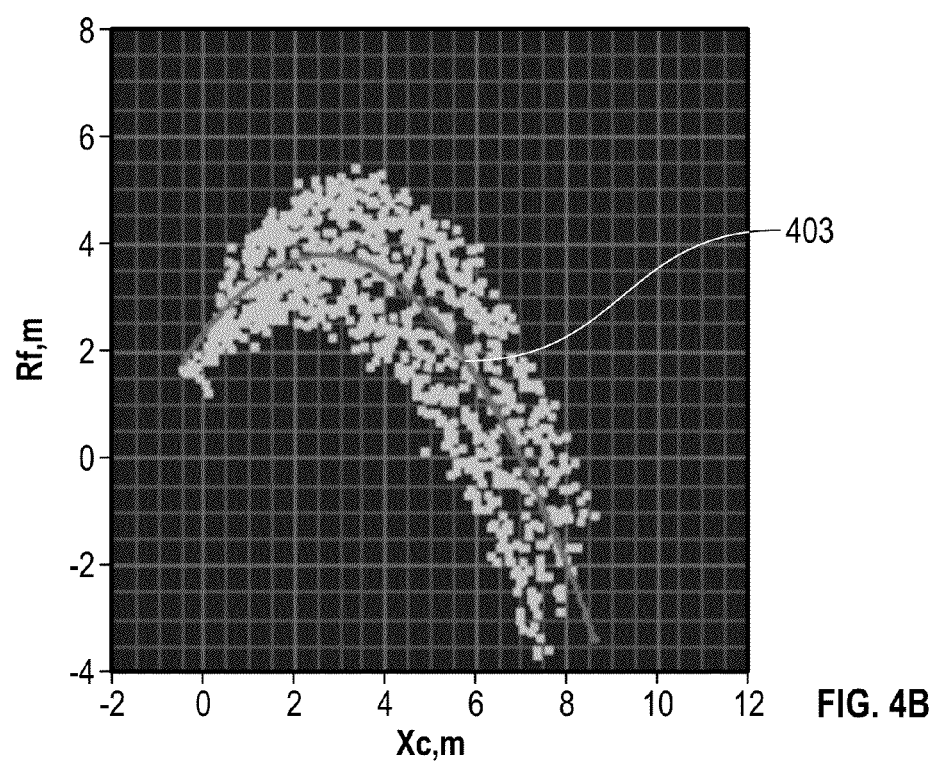
FIG. 4B shows the relationship between the measured resistance and reactance for the model assumed in the analysis.

To illustrate the concept of the present disclosure, FIG. 4A, shows a 2-D plot of $R_f$ (ordinate) and $X_c$ (abscissa) to which random uncorrelated noise has been added. A reference line for a constant value of $R_f$ is denoted by 401. FIG. 4B shows the resulting 2-D plot of $R_{f,m}$ and $X_{c,m}$ that would be measured by the physical layout of FIG. 3A. The reference line 401 maps to the curve 403.

The following operations are then carried out on the data of FIG. 4B:
1. Determination of first moment;
2. A principal component analysis; and
3. Integration.

Figure 4C:
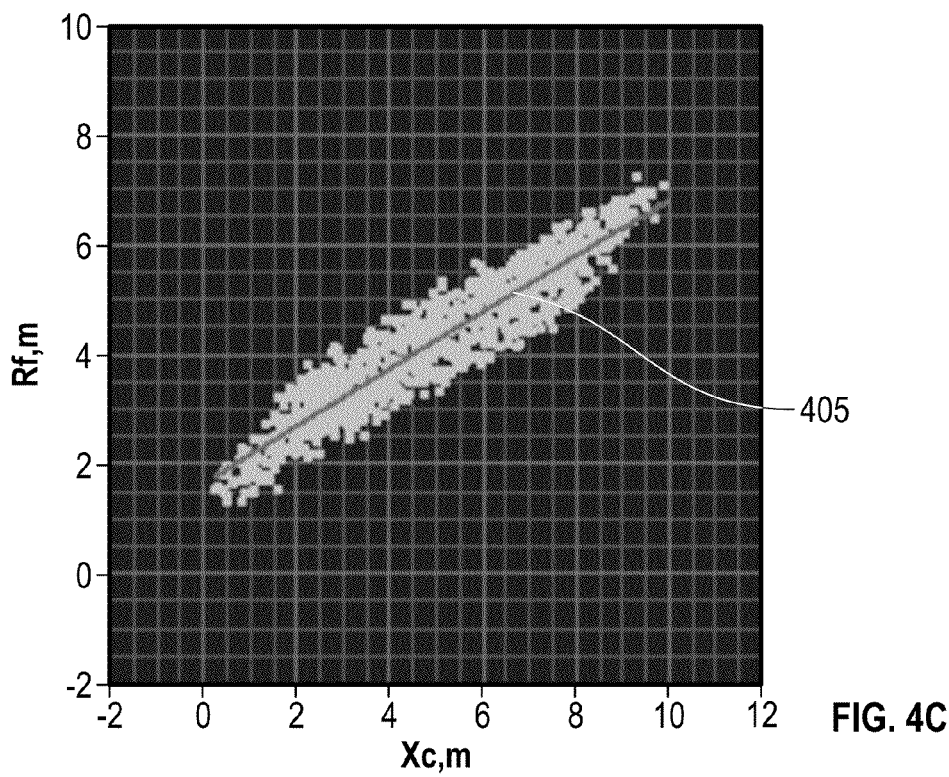
FIG. 4C shows a result of applying the first moment, principal analysis (PCA), and integration into the data of FIG. 4B.
Figure 4D:
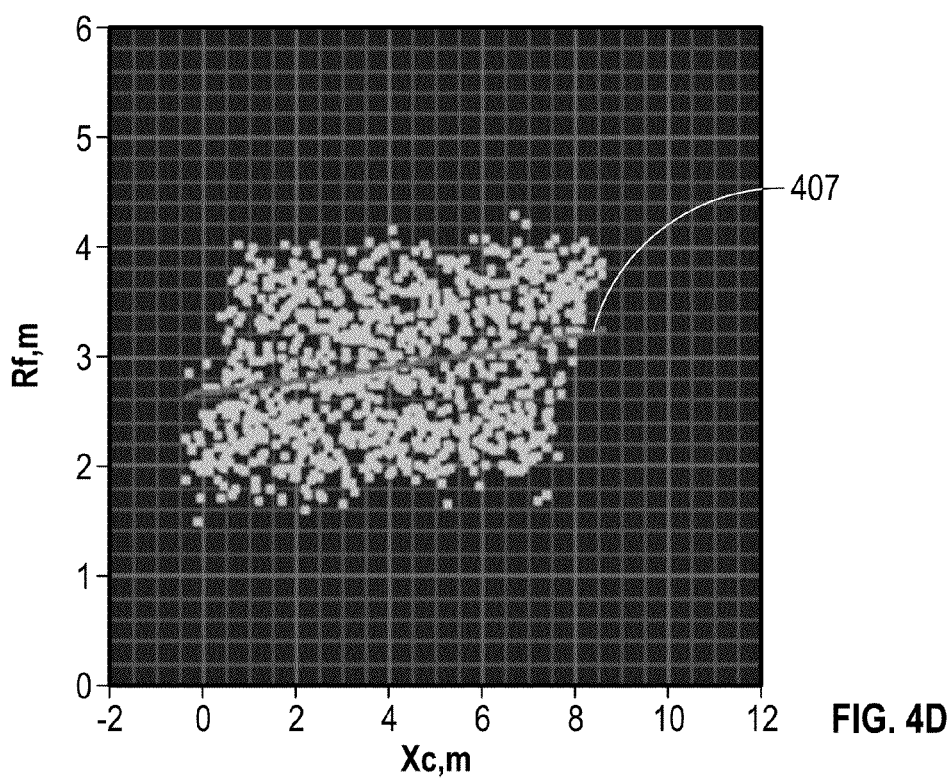
FIG. 4D shows the results of applying zero moment and PCA to the data of FIG. 4C.

These three operations are described further below. The result of applying these operations is to give the result shown in FIG. 4C where the reference line 401 maps to curve 405. As in FIG. 4B, the abscissa is a measured reactance and the ordinate is a measured resistance. Taking the zero moment and PCA of FIG. 4C gives the result in FIG. 4D. The reference line 401 now maps to 407 that is quite close to the actual reference line of 401 in FIG. 4A.

Figure 5A:
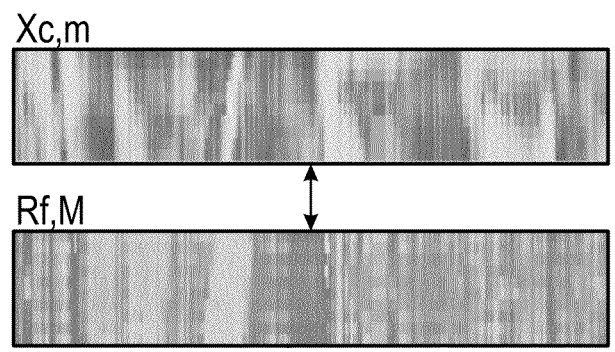
FIG. 5A shows an exemplary reactive component image and an exemplary real component of a well log.
Figure 5B:
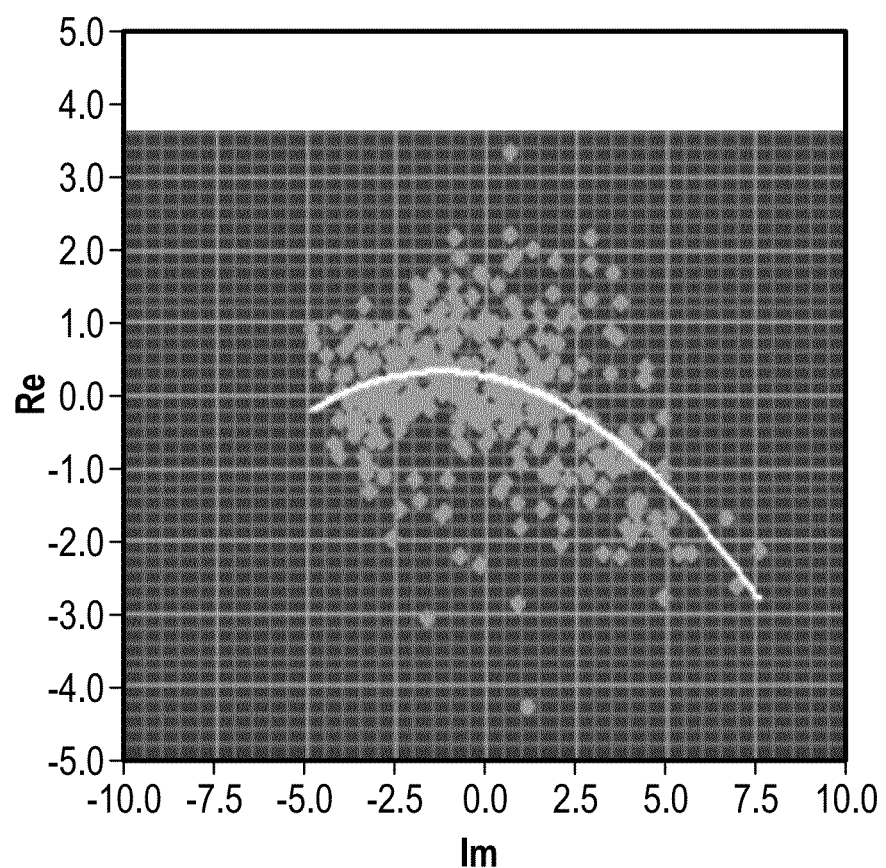
FIG. 5B shows the plot of the two components of the well log shown in FIG. 5A.
Figure 5C:
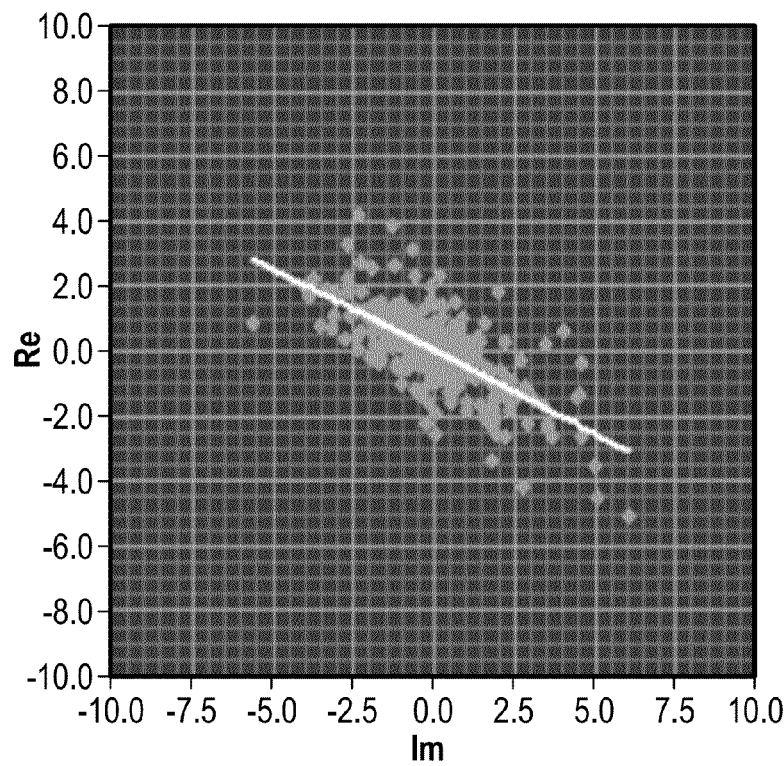
FIG. 5C shows the first moment of the data in FIG. 5D.
Figure 5D:
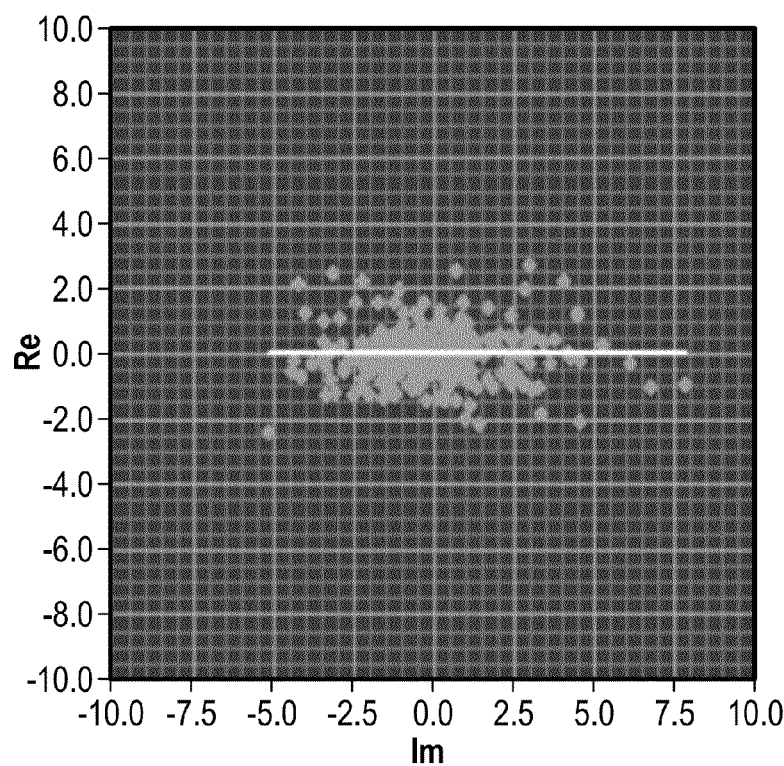
FIG. 5D shows the first moment PCA of the data in FIG. 5C.
Figure 5E:
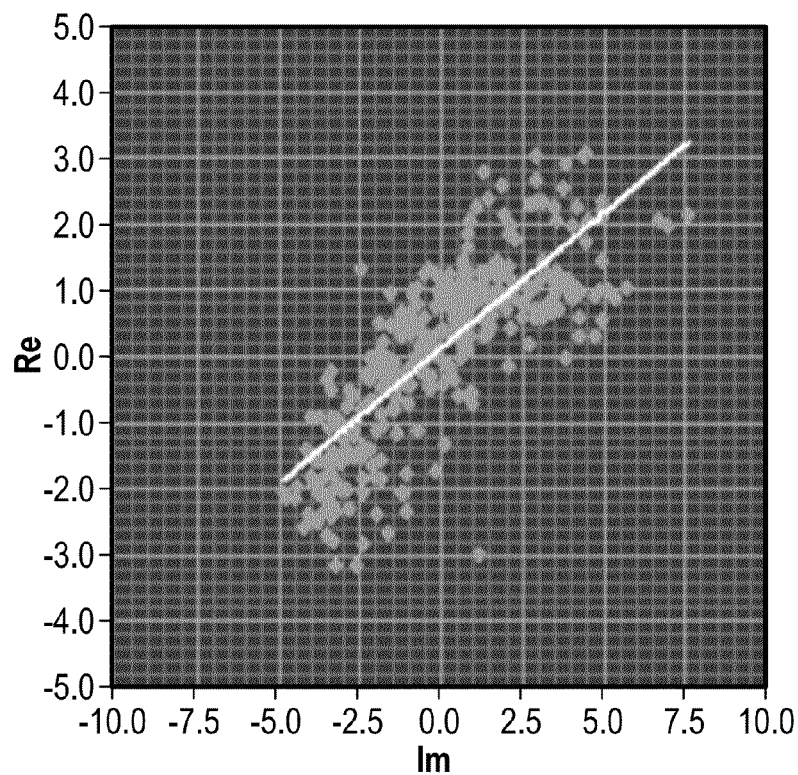
FIG. 5E shows the integrated zero moment of the data in FIG. 5D.
Figure 5F:
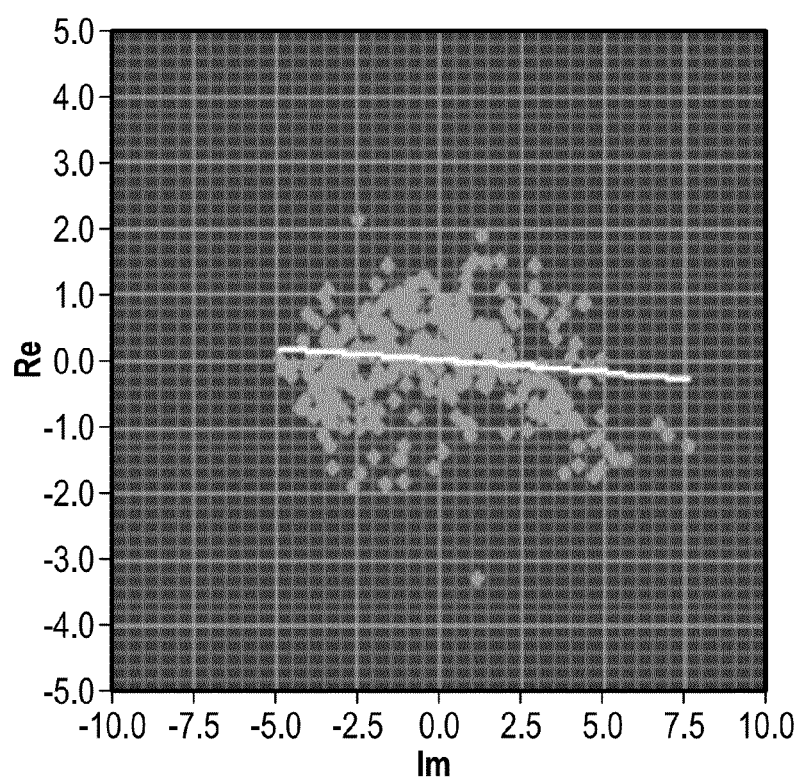
FIG. 5F shows the zero moment PCA of the data in FIG. 5E.
Figure 5G:
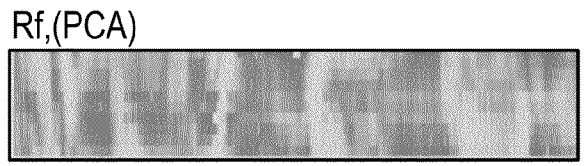
FIG. 5G shows the estimated real component of resistivity.
Figure 5H:
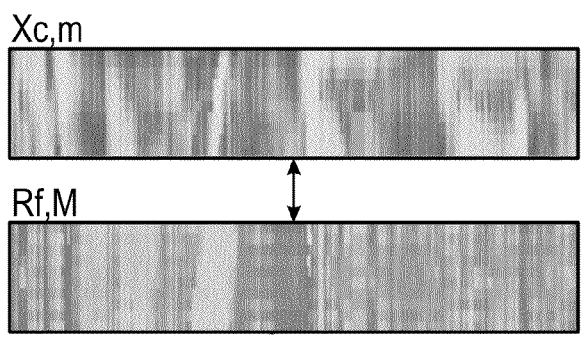
FIG. 5H shows, for comparison with FIG. 5G, the data of FIG. 5A.

Application of the method is shown with respect to FIGS. 5A-5H. FIG. 5A shows the resistive and reactive components of a resistivity image in a borehole. FIG. 5B is a 2-D plot similar to FIG. 4B and is obtained by mapping two components of each point on a resistivity image to a 2-D display. FIG. 5C shows the results of the first moment calculation, FIG. 5D shows the first moment PCA; FIG. 5E shows the integrated zero moment; FIG. 5F shows the zero moment PCA; FIG. 5G shows the estimated resistivity image obtained by mapping the ordinate value of the individual points in FIG. 5F to a resistivity image. For comparison, the original measurements are shown in FIG. 5H. The extent to which the image of FIG. 5G differs from the resistive image in FIG. 5H is an indication of the extent to which the gap between the measure electrode and the borehole wall affects the image of the resistive component. Next, details of the method used for processing the data and discussed.

The first moment analysis starts with eqn.(2). In order to do a principal component analysis, an estimate of the quantity:

$$\frac{\partial R_{f,m}}{\partial X_c} = k_1 + 2k_2 X_c \qquad (3)$$

is needed. This is the sensitivity of the measured formation resistivity to a change in the gap capacitance. Advantage is taken of the fact that all the measurements made are continuous functions of time. Accordingly, differentiation with respect to time gives:

$$\frac{dR_{f,m}}{dt} \approx k_0 \frac{dR_f}{dt} + k_1 \frac{dX_c}{dt} + 2k_2 X_c \frac{dX_c}{dt} \qquad (4)$$

$$\frac{dX_{c,m}}{dt} \approx k_R \frac{dR_f}{dt} + k_c \frac{dX_c}{dt}.$$

Two assumptions are made. The first assumption is that

1. $k_r \to 0$ or $\frac{dR_f}{dt} \to 0$.

This means that either the formation resistivity does not affect the reactive component of the measurement, or that the formation resistivity is a slowly changing function of time. The second assumption that is made is that:

2. there is a mapping $f$ that maps $X_c$ to $R_{f,m}$ and an inverse mapping $f^{-1}$ from $X_{c,m}$ to $X_c$. The mapping $f$ may be referred to as an injective mapping because it is obtained by injecting currents into the earth formation. As a result of the current injection, corresponding to each value of $X_c$, there is a corresponding value of $R_{f,m}$. The inverse mapping $f^{-1}$ from the measured reactance may be referred to as a surjective mapping.

Under these assumptions, $$\frac{\partial R_{f,m}}{\partial X_c} \approx \frac{\partial R_{f,m}}{\partial X_{c,m}} \approx \frac{\frac{dR_{j,m}}{dt}}{\frac{dX_{c,m}}{dt}} \approx \frac{1}{k_c}\left(k_0 \frac{\partial R_f}{\partial X_c} + 2k_2 X_c\right), \qquad (5)$$

where $$\frac{dX_{c,m}}{dt} \neq 0. \qquad (6)$$

Hence the sensitivity of the measured resistance to the gap reactance may be estimated using the time derivatives of the measured resistance and the measured reactance. It should further be noted that when $COV(R_F, X_C)=0$, i.e., that the formation resistivity and the gap reactance are uncorrelated, eqn.(5) reduces to $$\frac{\partial R_{c,m}}{\partial X_c} = \frac{1}{k_c}(k_1 + 2k_2 X_c).$$

This is linear and linked to $$\frac{dX_{c,m}}{dt} \text{ and } \frac{dR_{f,m}}{dt}.$$

The principal component analysis that is done is the standard PCA. Starting with two vectors of measurements $[R_{f,m}] = [R_{f,m}(0), R_{f,m}(1), \ldots R_{f,m}(N-1)]$ $[X_{c,m}] = [X_{c,m}(0), X_{c,m}(1), \ldots X_{c,m}(N-1)]$ a matrix of measurement $$Y = \begin{bmatrix} R_{f,m} \\ X_{c,m} \end{bmatrix}$$

is defined. The mean value of the matrix is subtracted to give:

$$Y_0 = Y - E(Y) = Y - \begin{bmatrix} E\{R_{f,m}\} \\ E\{X_{c,m}\} \end{bmatrix} = \begin{bmatrix} \overline{R_{f,m,0}} \\ \overline{X_{c,m,0}} \end{bmatrix}.$$

The covariance C of Y is given by $$C = COV(Y_0 Y_0^T) = \begin{bmatrix} R_{f,m,0} \cdot R_{f,m,0} & R_{f,m,0} \cdot X_{c,m,0} \\ X_{c,m,0} \cdot R_{f,m,0} & X_{c,m,0} \cdot X_{c,m,0} \end{bmatrix}.$$

The matrix C is a positive semi-definite symmetrical matrix. The zero mean measurements are projected on the eigenvector corresponding to the largest eigenvalue of C. The eigenvector corresponding to the largest eigenvalue may be referred to as a principal eigenvector.

Figure 6:
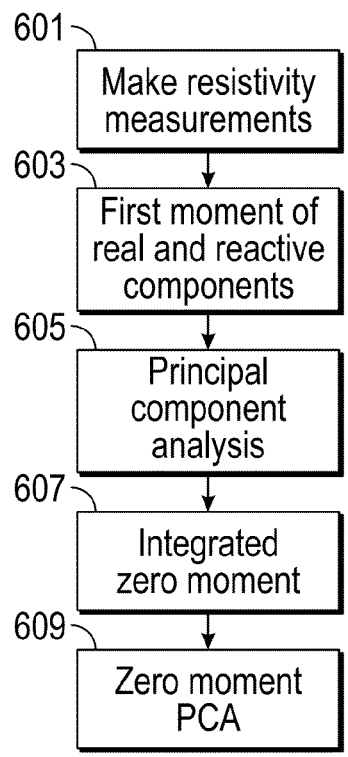
FIG. 6 shows a flowchart of some of the steps of the present disclosure.

Turning now to FIG. 6, a flowchart summarizing a method 600 according to one embodiment of the present disclosure is shown. In step 601, resistivity measurements may be made using a logging tool 10 conveyed in a borehole 12. The logging tool 10 may include a measure electrode 305 and a return electrode 315. The measurements may include the real and reactive components. In step 603, the first moment of the 2-D distribution may be obtained. This involves using a sensitivity of a real part of the measured impedance to a reactance of a gap between the resistivity sensor and a borehole wall, the sensitivity being estimated from the time derivative of the measurements and eqns. (3)-(6). In step 605, a principal component analysis may be carried out and a projection made on the eigenvector (a principal eigenvector) corresponding to the largest eigenvalue of a covariance matrix. In some embodiments, step 605 may include estimating the covariance matrix of the time derivative of the real part of the measured impedance and the time derivative of the reactive part of the measured impedance. In some embodiments, the these time derivatives may be projected on the principal eigenvector of the covariance matrix. In step 607, the effect of the time differentiation may be undone by an integration. In step 609, the data may be projected back into the original space by undoing the projection onto the principal eigenvector. An image of the real component of the plot in 609 may be produced: an example being shown in FIG. 5G.

The device may be used to measure any resistivity property of the earth formation. Resistivity properties may include, but are not limited to, resistivity, conductivity, permittivity and dielectric constant.

The operation of the transmitter and receivers may be controlled by the downhole processor and/or the surface processor. Implicit in the control and processing of the data is the use of a computer program implemented on a suitable machine readable medium that enables the processor to perform the control and processing. The machine readable medium may include ROMs, EPROMs, EAROMs, Flash Memories and Optical disks.

What is claimed is:

1. A method of estimating a resistivity property of an earth formation in a borehole filled with an oil-based mud, the method comprising:
    conveying a carrier into the borehole;
    measuring a plurality of apparent impedance values of the earth formation using a resistivity sensor on the carrier; and
    using a sensitivity of a real part of the measured impedance to a reactance of a gap between the resistivity sensor and a borehole wall for estimating a resistivity property of the earth formation,
    wherein the sensitivity is indicative of a relationship between changes in the real part of the measured impedance to changes in the reactance of the gap.

2. The method of claim 1 further comprising estimating the sensitivity of the real part of the measured impedance to the reactance of the gap between the resistivity sensor and the borehole wall by using a time derivative of the real part of the measured impedance and a time derivative of a reactive part of the measured impedance.

3. The method of claim 2 further comprising performing a principal component of analysis of the time derivative of the real part of the measured impedance and the time derivative of the reactive part of the measured impedance.

4. The method of claim 2 further comprising estimating a covariance matrix of the time derivative of the real part of the measured impedance and the time derivative of the reactive part of the measured impedance.

5. The method of claim 4 further comprising projecting the time derivative of the real part of the measured impedance and the time derivative of the reactive part of the measured impedance on a principal eigenvector of the covariance matrix.

6. The method of claim 1 further comprising:
    using, as part of the resistivity sensor, a measure electrode and a return electrode; and
    estimating the apparent impedance values from a potential of the measure electrode and a current in the measure electrode.

7. The method of claim 1 further comprising using a conveyance device to convey the carrier into the borehole, the conveyance device being selected from: (i) a wireline, (ii) a drillstring, (iii) coiled tubing, or (iv) a slickline.

8. An apparatus configured to estimate a resistivity property of an earth formation in a borehole filled with oil-based mud, the apparatus comprising:
    a carrier configured to be conveyed into the borehole;
    a resistivity sensor on the carrier configured to measure a plurality of apparent impedance values of the earth formation,
    a processor configured to use a sensitivity of a real part of the measured impedance to a reactance of a gap between the resistivity sensor and a borehole wall for estimating a resistivity property of the earth formation,
    wherein the sensitivity is indicative of a relationship between changes in the real part of the measured impedance to changes in the reactance of the gap.

9. The apparatus of claim 8 wherein the processor is further configured to estimate the sensitivity of the real part of the measured impedance to the reactance of the gap between the resistivity sensor and the borehole wall by using a time derivative of the real part of the measured impedance and a time derivative of a reactive part of the measured impedance.

10. The apparatus of claim 9 wherein the processor is further configured to perform a principal component of analysis of the time derivative of the real part of the measured impedance and the time derivative of the reactive part of the measured impedance.

11. The apparatus of claim 9 wherein the processor is further configured to estimate a covariance matrix of the time derivative of the real part of the measured impedance and the time derivative of the reactive part of the measured impedance.

12. The apparatus of claim 11 wherein the processor is further configured to project the time derivative of the real part of the measured impedance and the time derivative of the reactive part of the measured impedance on a principal eigenvector of the covariance matrix.

13. The apparatus of claim 8 wherein the resistivity sensor further comprises a measure electrode and a return electrode, and wherein the processor is further configured to estimate the impedance values using a voltage of the measure electrode and a current in the measure electrode.

14. The apparatus of claim 8 further comprising a conveyance device configured to convey the carrier into the borehole, the conveyance device being selected from: (i) a wireline, (ii) a drillstring, (iii) coiled tubing, or (iv) a slickline.

15. A non-transitory computer-readable medium product having thereon instructions that when read by a processor causes the processor to execute a method, the method comprising:
    using a sensitivity of a real part of an impedance measured by a resistivity sensor conveyed in a borehole to a reactance of a gap between the resistivity sensor and a borehole wall for estimating a resistivity property of the earth formation,
    wherein the sensitivity is indicative of a relationship between changes in the real part of the measured impedance to changes in the reactance of the gap.

16. The non-transitory computer-readable medium product of claim 15 further comprising at least one of: (i) a ROM, (ii) an EPROM, (iii) an EAROM, (iv) a flash memory, or (v) an optical disk.

* * * * *